(12) United States Patent
Kaneko

(10) Patent No.: US 12,470,507 B2
(45) Date of Patent: Nov. 11, 2025

(54) INFORMATION PROCESSING DEVICE AND NON-TRANSITORY COMPUTER-READABLE RECORDING MEDIUM RECORDING INFORMATION PROCESSING PROGRAM FOR EXTRACTING DOCUMENT FROM DESIGNATED MESSAGE

(71) Applicant: FUJIFILM Business Innovation Corp., Tokyo (JP)

(72) Inventor: Hiroyuki Kaneko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 196 days.

(21) Appl. No.: 18/161,100

(22) Filed: Jan. 30, 2023

(65) Prior Publication Data

US 2023/0291701 A1    Sep. 14, 2023

(30) Foreign Application Priority Data

Mar. 14, 2022    (JP) .................. 2022-039488

(51) Int. Cl.
*G06F 15/16* (2006.01)
*H04L 51/08* (2022.01)

(52) U.S. Cl.
CPC .................. *H04L 51/08* (2013.01)

(58) Field of Classification Search
CPC ...................................... H04L 51/08
USPC ........................................ 709/206
See application file for complete search history.

(56) References Cited

U.S. PATENT DOCUMENTS

| | | | | |
|---|---|---|---|---|
| 7,320,020 B2* | 1/2008 | Chadwick | ............ | H04L 51/212 709/204 |
| 7,346,621 B2* | 3/2008 | Zhang | ................... | G06F 16/951 707/999.102 |
| 7,412,447 B2* | 8/2008 | Hilbert | ..................... | G06F 16/48 |
| 7,523,168 B2* | 4/2009 | Chadwick | ............ | H04L 51/212 709/206 |
| 7,882,185 B2* | 2/2011 | Nagarajan | ............ | G06Q 10/107 709/200 |
| 8,037,137 B2* | 10/2011 | Keohane | ............. | G06Q 10/107 709/206 |
| 8,392,379 B2* | 3/2013 | Lee | ....................... | G06F 21/564 707/758 |
| 9,298,783 B2* | 3/2016 | Brezina | ................. | G06F 16/248 |
| 9,455,939 B2* | 9/2016 | Meisels | ................... | H04L 51/08 |
| 9,832,149 B2* | 11/2017 | Uraizee | ................. | H04L 51/08 |
| 9,946,722 B2* | 4/2018 | Clark | ......................... | G06F 7/36 |
| 10,936,639 B2* | 3/2021 | Gujarathi | .............. | G06F 40/258 |
| 11,134,044 B1* | 9/2021 | Johansson | ............... | H04L 51/18 |
| 11,418,541 B2* | 8/2022 | Kras | .................. | H04L 63/1416 |
| 11,468,107 B2* | 10/2022 | Gujarathi | ............. | H04L 51/063 |
| 11,886,393 B2* | 1/2024 | Yamamoto | ............ | H04L 67/306 |
| 2004/0187075 A1* | 9/2004 | Maxham | ................ | G06F 16/93 715/255 |

(Continued)

FOREIGN PATENT DOCUMENTS

JP    2004118737    4/2004

*Primary Examiner* — Alicia Baturay
(74) *Attorney, Agent, or Firm* — JCIPRNET

(57) ABSTRACT

An information processing device includes a processor, in which the processor accepts designation of a message, and presents a document used by a user within a period determined from a time when at least one of a designated message and a message related to the designated message has been transmitted, as a document related to the designated message.

12 Claims, 5 Drawing Sheets

(56) References Cited

U.S. PATENT DOCUMENTS

| | | | |
|---|---|---|---|
| 2006/0031324 A1* | 2/2006 | Chen | H04L 51/216 709/206 |
| 2006/0218139 A1* | 9/2006 | Goto | G06Q 10/00 707/999.005 |
| 2007/0271344 A1* | 11/2007 | Danasekaran | G06Q 10/10 709/206 |
| 2008/0005685 A1* | 1/2008 | Drews | G06F 3/0481 715/764 |
| 2008/0033919 A1* | 2/2008 | Arrouye | G06F 16/248 |
| 2012/0143960 A1* | 6/2012 | Corrao | H04L 51/216 709/206 |
| 2014/0222785 A1* | 8/2014 | Arrouye | G06F 16/907 707/722 |
| 2019/0228055 A1* | 7/2019 | Watanabe | G06F 40/137 |
| 2022/0239613 A1* | 7/2022 | Kobayashi | H04L 51/08 |
| 2023/0379286 A1* | 11/2023 | Maruyama | H04L 51/216 |

* cited by examiner

DESTINATION: SATOH
COPY: SUZUKI, TANAKA
SENDER: YAMADA
TRANSMISSION DATE AND TIME: AUGUST 20, 2020, 10:15:20
SUBJECT: REPORT OF AUGUST 2020

TEXT MAIN BODY:
RESEARCH RESULT HAS BEEN PREPARED.
PLEASE CONFIRM.

| RELATED DOCUMENT | DATE AND TIME OF USE | THE NUMBER OF TIMES OF USE |
|---|---|---|
| REPORT OF AUGUST 2020 | 2020/08/20 | 10 |
| RESEARCH GUIDE | 2020/08/19 | 5 |
| PRODUCT SPECIFICATIONS | 2021/01/10 | 4 |
| REPORT OF JULY 2020 | 2020/07/20 | 4 |
| PRODUCT USE GUIDE | 2019/10/01 | 1 |

INFORMATION PROCESSING DEVICE AND NON-TRANSITORY COMPUTER-READABLE RECORDING MEDIUM RECORDING INFORMATION PROCESSING PROGRAM FOR EXTRACTING DOCUMENT FROM DESIGNATED MESSAGE

CROSS-REFERENCE TO RELATED APPLICATIONS

This application is based on and claims priority under 35 USC 119 from Japanese Patent Application No. 2022-039488 filed Mar. 14, 2022.

BACKGROUND

(i) Technical Field

A technology of the present invention relates to an information processing device and a non-transitory computer-readable recording medium recording a program.

(ii) Related Art

There is provided a technique for extracting a document related to a message.

JP2004-118737A discloses an information sharing system that presents messages transmitted and received between a plurality of users and a plurality of contents so as to be related to each other, the information sharing system including: a message operation history recording means that records an operation history of messages transmitted and received between the plurality of users; a content operation history recording means that records an operation history of the plurality of contents by the plurality of users; a first degree of relevance deriving means that derives a degree of relevance between at least one message in the operation history of the messages and the plurality of contents on the basis of the operation history of the messages transmitted and received between the plurality of users and the operation history of the plurality of contents by the plurality of users; and a related content presenting means that selects, for the at least one message, at least one content among the plurality of contents according to the degree of relevance derived by the first degree of relevance deriving means and presents the selected content so as to be related to the at least one message.

SUMMARY

As a technique for presenting a document related to an arbitrary message, there is provided a technique of extracting a document related to a message, for example, an e-mail by attachment or citation.

However, with the above-described technique, only a document directly related to a message itself can be presented. For example, a document that is not directly related to a message but has been used for reading or the like after a time when the message was transmitted may be related to the message.

Aspects of non-limiting embodiments of the present disclosure relate to an information processing device capable of presenting even a document that is not directly related to a message as a document that can be relevant.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing device including a processor, in which the processor accepts designation of a message, and presents a document used by a user within a period determined from a time when at least one of a designated message and a message related to the designated message has been transmitted, as a document related to the designated message.

DETAILED DESCRIPTION

Figure 1:
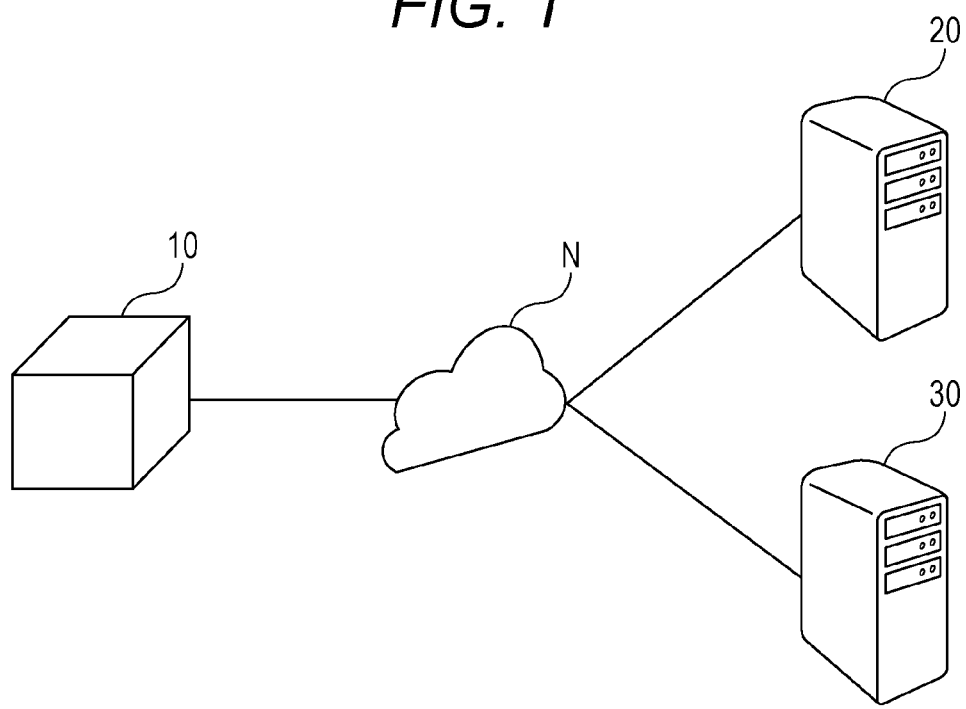
FIG. 1 is a schematic configuration diagram of a system of an information processing device according to an embodiment.

In the following, an example of an embodiment of the technique of the present invention will be described with reference to the drawings. In each drawing, the same or equivalent components and parts are denoted by the same reference numerals. In addition, dimensional ratios in the drawings are exaggerated for convenience of explanation and may be different from actual ratios.

FIG. 1 is a schematic configuration diagram of a system of an information processing device 10 of the present disclosure. The information processing device 10 is capable of communicating with a message server 20 and a document management server 30 via a network N. The information processing device 10 presents a document that can be relevant to a designated message. In the following description, a designated message may be referred to as a designation message. Similarly, a document that can be relevant to a designation message may be referred to as an related document.

The message server 20 is a server that manages messages. The message server 20 is, for example, a mail server, a server that manages chat, or a project management server. Here, the message includes an exchange between users, such as a mail, a chat, a task ticket, or a workflow. The message server 20 manages messages by threads. Here, the thread is a unit indicating a group of a series of messages. A thread is configured with a series of messages including a designation message.

The document management server 30 is a server that enables sharing of a document. The document includes a book, a product of document creation software, an Hyper-Text Markup Language (HTML) file, and the like. The document management server 30 may manage documents as a shared folder. The document management server 30 holds use histories of documents by users. The use history is a history in which a user who used a document and a date and time of the use are recorded for each document. Use of a document includes reading, acquiring, updating, copying, etc. of the document. In the following description, a use history may be simply referred to as a history.

Figure 2:
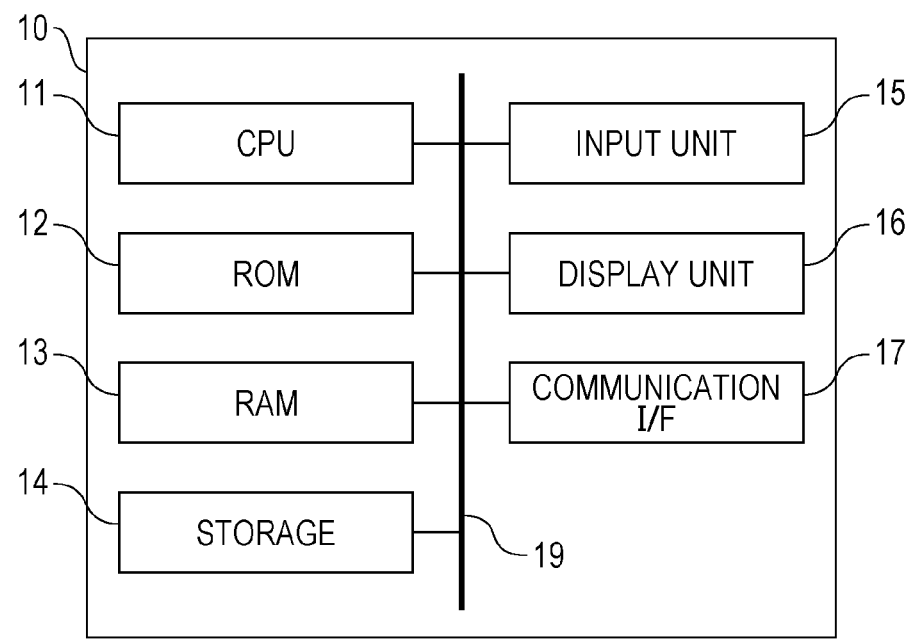
FIG. 2 is a block diagram illustrating a hardware configuration of the information processing device according to the present embodiment.

FIG. 2 is a block diagram illustrating a hardware configuration of the information processing device 10. The information processing device 10 includes a central processing unit (CPU) 11, a read only memory (ROM) 12, a random access memory (RAM) 13, a storage 14, an input unit 15, a display unit 16, and a communication interface (communication I/F) 17. Each component is communicably connected to each other via a bus 19.

The CPU11 is a central processing unit, and executes various programs or controls each unit. In other words, the CPU11 reads a program from the ROM12 or the storage 14 and executes the program using the RAM13 as a work area. The CPU11 performs control of each of the above-described components and various kinds of arithmetic processing according to a program recorded in the ROM12 or the storage 14. In the present embodiment, the ROM12 or the storage 14 stores an information processing program for presenting a document that can be relevant.

The ROM12 stores various programs and various data. The RAM 13 temporarily stores a program or data as a work area. The storage 14 is configured with a hard disk drive (HDD) or a solid state drive (SSD), and stores various programs including an operating system and various data.

The input unit 15 includes a pointing device such as a mouse, and a keyboard, and is used for performing various inputs.

The display unit 16, which is, for example, a liquid crystal display, displays various information. The display unit 16 may adopt a touch panel system to function as the input unit 15.

The communication interface 17 is an interface for communicating with other apparatuses such as a database, and a standard such as Ethernet (registered trademark), FDDI, or Wi-Fi (registered trademark) is used.

Next, a functional configuration of the information processing device 10 will be described.

Figures 3, 4:
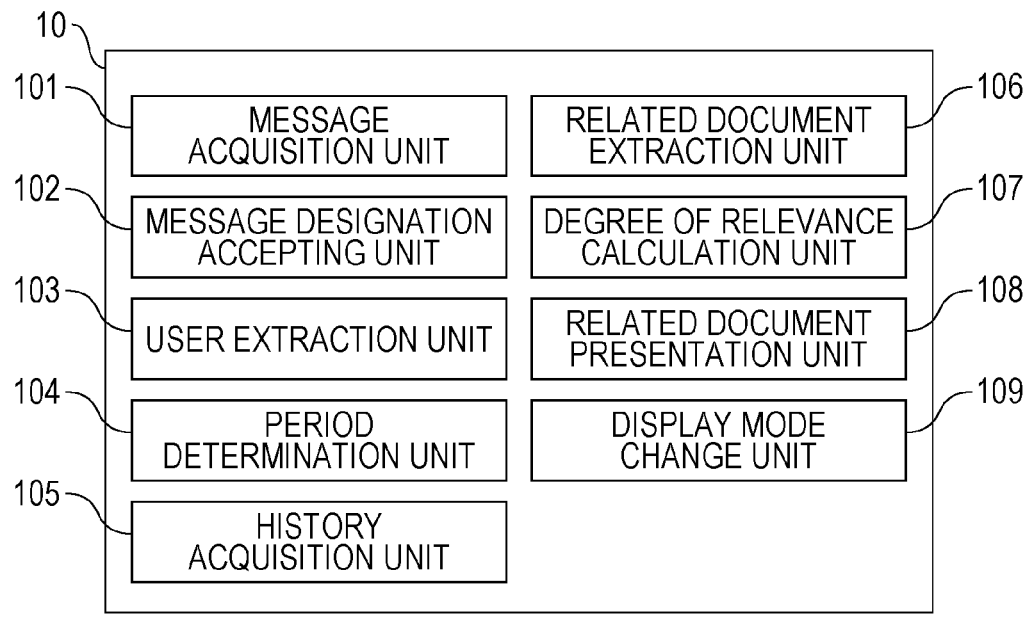
FIG. 3 is a block diagram illustrating a functional configuration of the information processing device according to the present embodiment.
FIG. 4 illustrates an example of a message.

FIG. 3 is a block diagram illustrating an example of the functional configuration of the information processing device 10. The information processing device 10 includes, as a functional configuration, a message acquisition unit 101, a message designation accepting unit 102, a user extraction unit 103, a period determination unit 104, a history acquisition unit 105, a related document extraction unit 106, a degree of relevance calculation unit 107, a related document presentation unit 108, and a display mode change unit 109. Each functional configuration is realized by the CPU11 reading an information processing program stored in the ROM12 or the storage 14, loading the program into the RAM13, and executing the program.

The message acquisition unit 101 acquires a message from the message server 20.

Here, an example of the message is shown in FIG. 4. The message includes a destination, a copy, a sender, a transmission date and time, a subject, and a text main body. The message may include, for example, an identifier for identifying a message and an identifier for identifying a thread in which the message is included. The message may include reception a date and time or reading date and time for each recipient as a destination or a copy.

The message designation accepting unit 102 accepts designation of a message.

The user extraction unit 103 extracts a user included in a transmission source, a destination, and a copy of a designation message and a related message. In other words, the user extraction unit 103 extracts a user who can use the related document. The user extraction unit 103 may extract a user who has authority to access the related document as a user who can use the related document.

Here, the related message is a message which is relevant to the designation message. The related message is, for example, a reply source message, a citation source message, or a transfer source message of the designation message. The related message is, for example, a reply message to the designation message, a message citing the designation message, or a transfer message of the designation message. In addition, the information processing device 10 may set a message relevant to the related message as a message relevant to the designation message.

The period determination unit 104 determines a calculation period that is a period for calculating a document used by a user. In the present disclosure, there is a case where the calculation period is simply referred to as a period.

The history acquisition unit 105 acquires a use history of a document from the document management server 30.

The related document extraction unit 106 extracts a related document.

The degree of relevance calculation unit 107 calculates a degree of relevance between a designation message and a related document.

The related document presentation unit 108 presents a related document.

The display mode change unit 109 makes display modes of a related document having a high degree of relevance and a related document having a low degree of relevance different from each other.

Next, operation of the information processing device 10 will be described.

Figure 5:
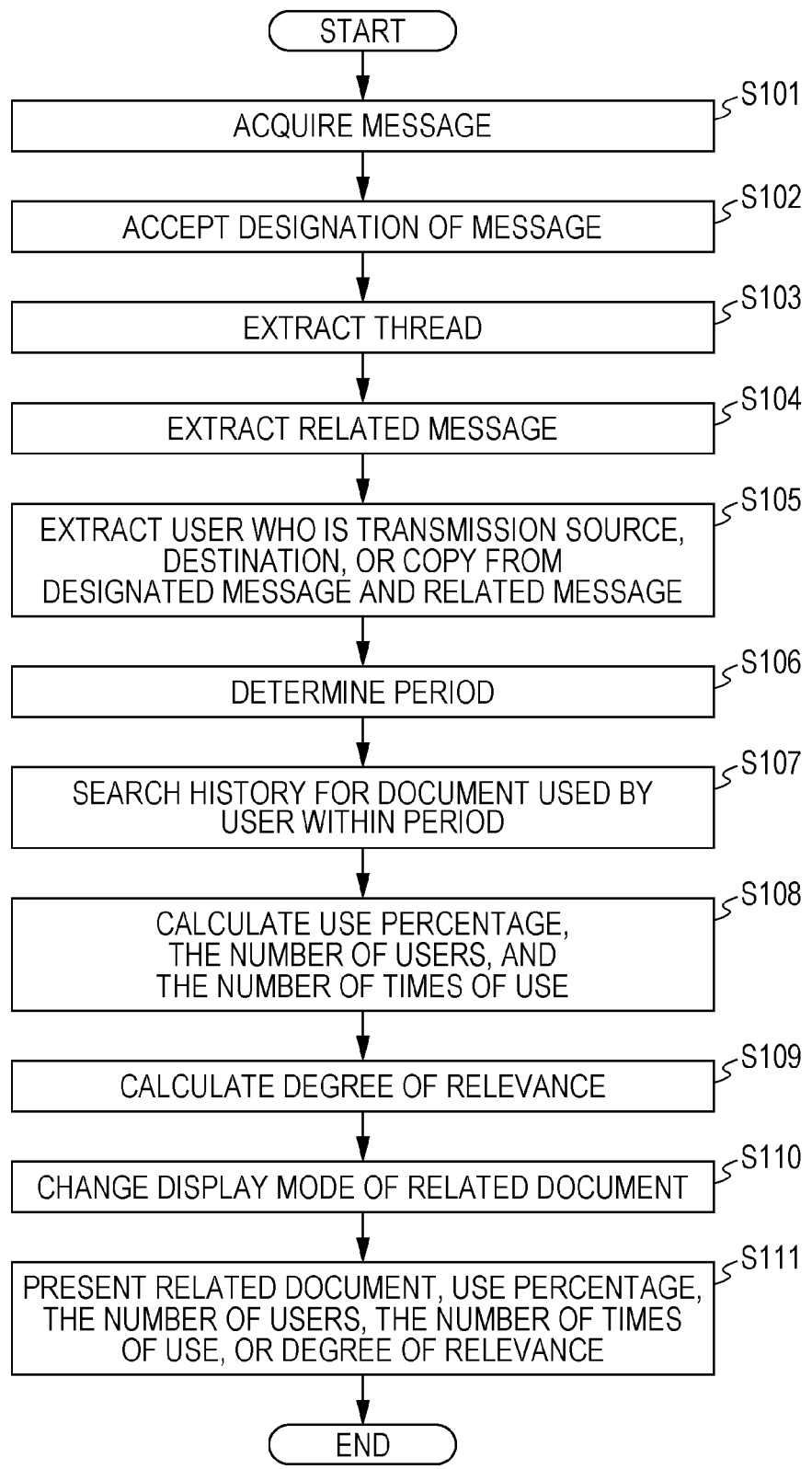
FIG. 5 is a flowchart showing a flow of presentation processing of the information processing device according to the present embodiment.

FIG. 5 is a flowchart illustrating a flow of presentation processing by the information processing device 10. The presentation processing is performed by the CPU11 reading a presentation program from the ROM12 or the storage 14, loading the program into the RAM13, and executing the program.

In Step S101, the CPU11 acquires a message. The CPU11 acquires a message from the message server 20. The CPU11 may collectively acquire messages from the message server 20, or may search the message server 20 as needed. The CPU11 proceeds to Step S102.

In Step S102, the CPU11 accepts designation of a message. For example, the CPU11 accepts designation of a message from a terminal device (not illustrated) operated by a user. For example, the CPU11 may accept designation of a message from the input unit 15 by operation of the user. Alternatively, the CPU11 may accept words and phrases for searching for a destination, a copy, a sender, a transmission date and time, a subject, a text main body, or the like, and may use a message identified from the accepted content as a designation message. Specifically in this case, the CPU11 uses a message including the accepted word and phrase in a destination, a copy, a sender, a transmission date and time, a subject, or a text main body as a designation message. The CPU11 proceeds to Step S103.

In Step S103, the CPU11 extracts a thread. In other words, the CPU11 identifies a thread including the designation message. In a case where the message server 20 does not manage a thread, the CPU11 may extract a group of a series of messages as a thread. The CPU11 proceeds to Step S104.

Here, the CPU11 extracts, for example, a group of mails having the same subject in the mails as a thread. The CPU11 extracts, for example, a group of exchanges such as replies to a mail or transfers thereof, as a thread. The CPU11 extracts, for example, a chat room in a chat as a thread. The CPU11 extracts, for example, a group of workflows or a group of a series of task tickets in a project management tool as a thread. The CPU11 extracts, for example, a group of messages identified by identifiers indicating a series of messages.

In Step S104, the CPU11 extracts a related message. For example, from a thread configured with a series of messages including the designation message, the CPU11 extracts a message other than the designation message as a related message. The CPU11 proceeds to Step S105.

In Step S105, the CPU11 extracts a user who is a transmission source, a destination, or a copy from the designation message and the related message. The CPU11 proceeds to Step S106.

In Step S106, the CPU11 determines a period. The CPU11 proceeds to Step S107.

Figures 6, 7:
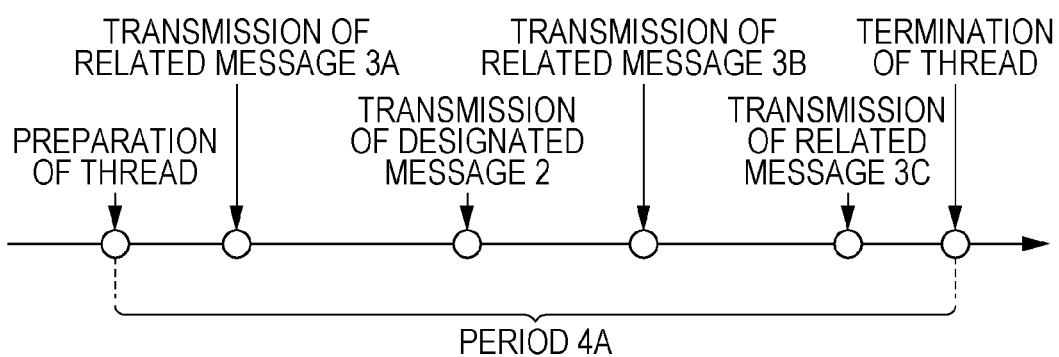
FIG. 6 illustrates an example of a period determined by the information processing device according to the present embodiment.
FIG. 7 illustrates an example of a display screen of the information processing device according to the present embodiment.

Here, an example of a period determined by the information processing device 10 is illustrated in FIG. 6. In FIG. 6, the horizontal axis is a time axis, and time elapses toward the right side. The time axis indicates that there sequentially occurs preparation of a thread, transmission of a related message 3A, transmission of a designation message 2, transmission of a related message 3B, transmission of a related message 3C, and termination of the thread. The thread is configured to include a series of messages, i.e., the designation message 2, the related message 3A, the related message 3B, and the related message 3C. At this time, the CPU11 determines a period 4A from a preparation time of the thread to before a termination time of the thread as a period.

Here, the CPU11 may use, among the related messages, a message transmitted earliest as a preparation date and time of the thread. A termination date and time of a thread is a date and time when the thread is terminated, deleted, or closed. The CPU11 may use the latest transmitted message among the related messages as a termination date and time of the thread. The CPU11 may use a time after a lapse of a predetermined time from a preparation date and time of a thread as a termination date and time of the thread.

In Step S107, the CPU11 searches the history for a document used by the user within the period. Specifically, the CPU11 searches the use history acquired from the document management server 30 for a document on the basis of the user extracted in Step S105 and the period determined in Step S106. The CPU11 proceeds to Step S108.

In Step S108, the CPU11 calculates a use percentage, the number of users, and the number of times of use. The CPU11 proceeds to Step S109.

Here, the use percentage is a percentage of users who have used the related document within the period among a plurality of users who can use the presented document. The number of users is the number of users who have used the related document within the period. The number of times of use is the number of times the users have used the related document within the period.

In Step S109, the CPU11 calculates a degree of relevance. The degree of relevance is a value indicating a degree of relevance between a designation message and a document. The CPU11 calculates a degree of relevance such that the higher the use percentage of the related document, the number of users of the related document, or the number of times of use of the related document, the higher the degree of relevance. The CPU11 weights, for example, the use percentage, the number of users, the number of times of use, or a combination thereof to calculate the degree of relevance. The CPU11 proceeds to Step S110.

In Step S110, the CPU11 changes a display mode of the related document. In other words, the CPU11 presents the related document in a display mode corresponding to the degree of relevance. The CPU11 causes related documents to be displayed in descending order of the degree of relevance, for example. The CPU11 causes, for example, a related document having a degree of relevance higher than a predetermined value to be displayed, and a related document having a degree of relevance lower than the predetermined value not to be displayed. The CPU11 displays, for example, only a related document used by all the users. The CPU11 proceeds to Step S111.

In Step S111, the CPU11 presents the related document, the use percentage, the number of users, the number of times of use, or the degree of relevance. In other words, the CPU11 presents the use percentage, the number of users, and the number of times of use of the related document along with the related document. The CPU11 displays the related document on the display unit 16, for example. The CPU11 transmits the related document to an external device using, for example, the communication interface 17. The CPU11 ends the presentation processing.

Here, an example of a period determined by the information processing device 10 is illustrated in FIG. 7. FIG. 7 illustrates an example of a display screen of the information processing device 10 according to the present embodiment. The CPU11 displays a display screen including, for example, an item of a related document, an item of update date and time, an item of the number of times of use, and the like on the display unit 16. The CPU11 causes such information for identifying a related document as a title to be displayed in the item of the related document. The CPU11 causes the date and time when the related document has been used to be displayed in an item of date and time of use. The CPU11 causes the number of times the related document has been used to be displayed in the item of the number of times of use.

As described in the foregoing, by the processing from Step S101 to Step S111 described above, the CPU11 presents the document used by the user within the period determined from the time when at least one of the designation message and the related message has been transmitted, as a document related to the designation message.

Modified Example

The information processing device 10 of the present embodiment has been described in the foregoing. The present disclosure is not, however, limited to the embodiment described above. Various improvements or modifications can be made.

Figure 8:
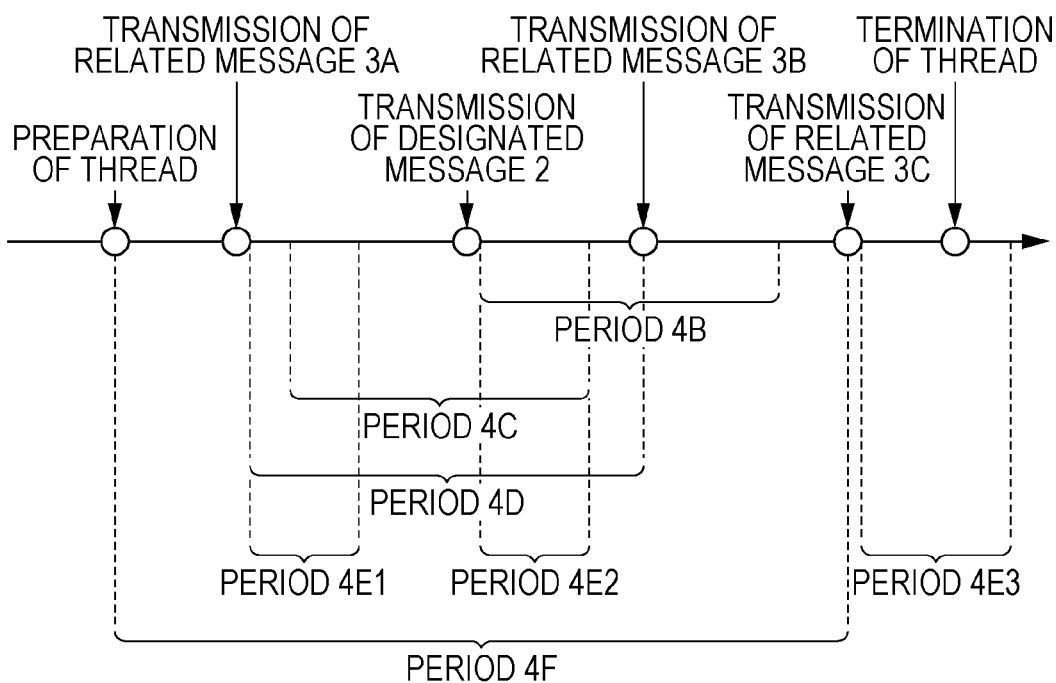
FIG. 8 illustrates an example of a period determined by an information processing device according to a modification.

The information processing device 10 according to the present embodiment may determine a period such as a period 4B to a period 4F illustrated in FIG. 8. In FIG. 8, the horizontal axis is a time axis, and time elapses toward the right side. The time axis indicates that there sequentially occurs preparation of a thread, transmission of a related message 3A, transmission of a designation message 2, transmission of a related message 3B, transmission of a related message 3C, and termination of the thread.

The CPU11 defines a period from a time when at least one of the designation message and the related message has been transmitted. For example, the CPU11 determines, as the period, the period 4B after a time of the transmission of the designation message 2. For example, the CPU11 determines, as the period, the period 4C after a time of the transmission of the related message 3A.

The CPU11 defines a period that starts after a time when the related message has been transmitted in a case where the related message has been transmitted earlier than the designation message and that ends before the time when the related message has been transmitted in a case where the related message has been transmitted later than the designation message. For example, the CPU11 determines, as the period, the period 4D that starts after the transmission time of the related message 3A message and ends before a transmission time of the related message 3B.

The CPU11 sets a plurality of periods from times when the plurality of related messages have been transmitted, respectively. For example, the CPU11 determines a period 4E1, a period 4E2 and a period 4E3 as periods. Here, the period 4E1 is a period after the transmission time of the related message 3A, the period 4E2 is a period after the transmission time of the designation message 2, and the period 4E3 is a period after a transmission time of the related message 3C. At this time, the CPU11 presents the documents used by the user within a plurality of periods as related documents.

The CPU11 defines a period that starts after a time of preparation of the thread or ends before time of closing of the thread or a time of transmission of the latest message in the thread. The latest message in the thread is, for example, a latest message at the time of acceptance of the designation message or at a time of each processing of the CPU11. For example, the CPU11 determines, as the period, the period 4F after the preparation time of the thread and before the transmission time of the related message 3C which is the latest message in the thread.

Figure 9:
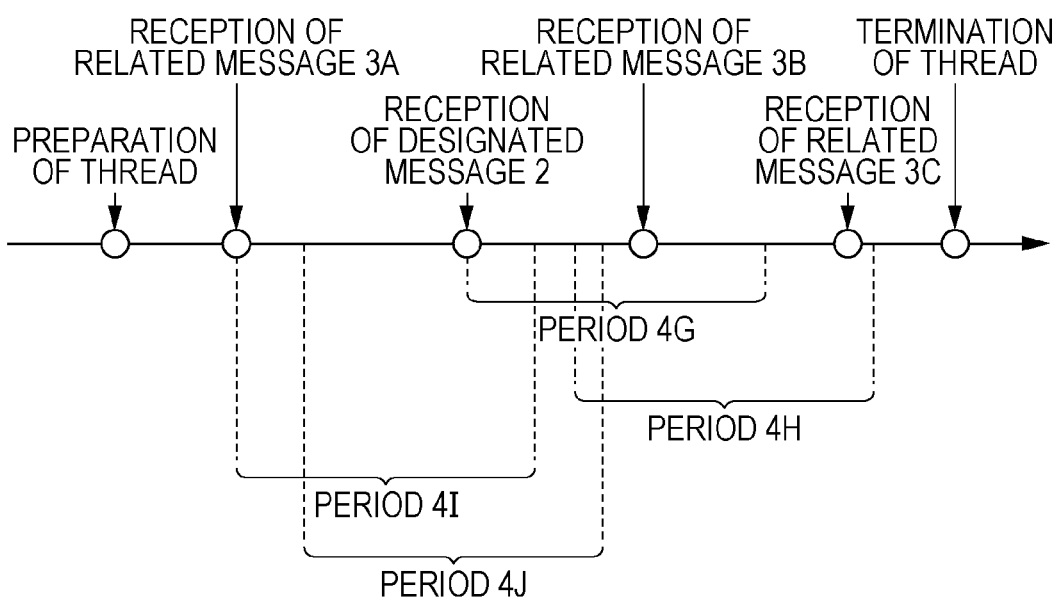
FIG. 9 illustrates an example of a period determined by an information processing device according to a modification.

The information processing device 10 according to the present embodiment may determine a period such as a period 4G to a period 4J illustrated in FIG. 9. In FIG. 9, the horizontal axis is a time axis, and time elapses toward the right side. The time axis indicates that there sequentially occurs the preparation of a thread, reception of the related message 3A, reception of the designation message 2, reception of the related message 3B, reception of the related message 3C, and the termination of the thread.

The CPU11 determines, as the period, a period after a time when the user having received the designation message or the related message received or read the designated message or the related message. For example, the CPU11 determines any one of the period 4G to the period 4J as the period. Here, the period 4G and a period 4H are periods after a time of the reception of the designation message 2, and a period 4I and the period 4J are periods after a time of reception of the related message 3A.

The information processing device 10 according to the present embodiment may use a period obtained by combining the above-described periods 4A to 4J as the calculation period.

In Step S109 in FIG. 5, the CPU11 may calculate a degree of relevance of the document so that a document used by a user as the destination has a higher degree of relevance than a document used by a user as a copy of the designation message. In other words, the CPU11 changes the degree of relevance of the document used by the user according to an attribute of the user. For example, the CPU11 defines a weight for each attribute of the user and reflects the weight on the degree of relevance calculated in above-described Step S109. The attribute of the user is, for example, a destination, a copy, or a sender of the designation message or the related message. Here, the destination is, for example, a user designated by TO in a mail, or a user designated by mention in a chat. The attribute of the user may be, for example, an official position in an organization or presence or absence of a decision-making authority.

In Step S109 of FIG. 5, the CPU11 may calculate a degree of relevance of a document so that a document used at a time closer to the time when at least one of the designation message and the related message has been transmitted as a higher degree of relevance. For example, the CPU11 calculates a degree of relevance such that the smaller a difference between a transmission date and time of the designation message and a use date and time of the document, the higher the degree of relevance of the document.

The above-described processing can also be realized by a dedicated hardware circuit. In this case, the processing may be executed by one piece of hardware, or may be executed by a plurality of pieces of hardware.

In the above embodiment, the processor refers to a processor in a broad sense, and includes a general-purpose processor (e.g, central processing unit (CPU) etc.) and a dedicated processor (e.g., graphics processing unit (GPU), application specific integrated circuit (ASIC), field programmable gate array (FPGA), programmable logic devices, or the like).

The operation of the processor in the above-described embodiment may be performed not only by one processor but also by cooperation of a plurality of processors present at physically separated positions. In addition, the order of the respective operations of the processor is not limited to the order described in the above embodiment, and may be appropriately changed.

The program for operating the information processing device 10 may be provided by a computer-readable recording medium, such as a universal serial bus (USB) memory, a flexible disk, or a compact disc read only memory (CD-ROM), or may be provided online via a network, such as the Internet. In this case, the program recorded on the computer-readable recording medium is generally transferred to and stored in a memory, a storage, or the like. Further, this program may be provided as independent application software, or may be incorporated into software of each device as one function of the information processing device 10.

What is claimed is:

1. An information processing device comprising:
   a processor configured to:
      accept a designation of a message which is a designated message, and present a document used by a user within a period determined from a time when at least one of the designated message or a related message related to the designated message has been transmitted, as a document related to the designated message, and in a case where the related message has been transmitted earlier than the designated message, the period starts after a time when the related message has been transmitted, and in a case where the related message has been transmitted later than the designated message, the period ends before the time when the related message has been transmitted.

2. The information processing device according to claim 1,
wherein the processor is configured to present, for each document presented, a use percentage of the document, the number of users of the document, or the number of times of use of the document, the use percentage being a percentage, among a plurality of users who can use the presented document, of the users who have used the presented document within the period, the number of users being the number of users who have used the presented document within the period, and the number of times of use being the number of times the users have used the presented document within the period.

3. The information processing device according to claim 1,
wherein the processor is configured to calculate a degree of relevance with the designated message for each document presented, and cause the document having a high degree of relevance and the document having a low degree of relevance to be displayed in modes different from each other.

4. The information processing device according to claim 3,
wherein the degree of relevance is higher for a document having a higher use percentage of the document, the higher number of users of the document, or the higher number of times of use of the document, the use percentage being a percentage, among a plurality of users who can use the presented document, of the users who have used the presented document within the period, the number of users being the number of users who have used the presented document within the period, and the number of times of use being the number of times the users have used the presented document within the period.

5. The information processing device according to claim 3,
wherein the degree of relevance is higher for a document used by a user who is a destination of the designated message than for a document used by a user who is a copy of the designated message.

6. The information processing device according to claim 3,
wherein the degree of relevance is higher for a document used at a time closer to a time when at least one of the designated message or the related message has been transmitted.

7. The information processing device according to claim 1,
wherein the processor is configured to set a plurality of the periods from times when a plurality of the related messages have been transmitted, respectively, and present a document used by a user within the plurality of periods as the related document.

8. The information processing device according to claim 1,
wherein the related message is a message other than the designated message in a thread configured with a series of messages including the designated message.

9. The information processing device according to claim 8,
wherein the period starts after a time of preparation of the thread, or ends before a time of closing of the thread or a time of transmission of a latest message in the thread.

10. The information processing device according to claim 1,
wherein the presented document is a document used by the user who has received the designated message or the related message after a time of the reception of the message or a time of reading of the same.

11. The information processing device according to claim 1,
wherein the processor is configured to search for a document used by the user within the period in a history in which a user who has used a document and a date and time when the user used the document are recorded for each document.

12. A non-transitory computer-readable recording medium recording a program causing a processor of a computer to execute:
accepting designation of a message which is a designated message;
presenting a document used by a user within a period determined from a time when at least one of the designated message or a related message related to the designated message has been transmitted, as a document related to the designated message;
determining whether the related message has been transmitted earlier or later than the designated message;
having determined that the related message has been transmitted earlier than the designated message, the period starts after a time when the related message has been transmitted; and
having determined that related message has been transmitted later than the designated message, the period ends before the time when the related message has been transmitted.

* * * * *